(12) United States Patent
Binder et al.

(10) Patent No.: US 7,174,705 B2
(45) Date of Patent: Feb. 13, 2007

(54) EXHAUST-GAS AFTERTREATMENT DEVICE WITH NITROGEN OXIDE STORAGE CATALYTIC CONVERTER, AND OPERATING METHOD THEREFOR

(75) Inventors: Klaus Binder, Deizisau (DE); Josef Günther, Affalterbach (DE); Andreas Hertzberg, Stuttgart (DE); Brigitte Konrad, Blaustein (DE); Bernd Krutzsch, Denkendorf (DE); Heinz-Jost Ölschlegel, Notzingen (DE); Stefan Renfftlen, Eislingen (DE); Dirk Voigtländer, Korntal-Münchingen (DE); Michel Weibel, Stuttgart (DE); Marko Weirich, Mannheim (DE); Günter Wenninger, Stuttgart (DE); Rolf Wunsch, Malsch (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/754,210

(22) Filed: Jan. 9, 2004

(65) Prior Publication Data

US 2004/0139737 A1    Jul. 22, 2004

Related U.S. Application Data

(63) Continuation of application No. 10/180,567, filed on Jun. 26, 2002, now Pat. No. 6,766,642.

(30) Foreign Application Priority Data

Jul. 3, 2001    (DE) ................ 101 31 588

(51) Int. Cl.
*F01N 3/00* (2006.01)
(52) U.S. Cl. ............... 60/295; 60/274; 60/297; 60/301; 60/311

(58) Field of Classification Search .............. 60/274, 60/285, 295, 297, 301, 311
See application file for complete search history.

(56) References Cited

U.S. PATENT DOCUMENTS

| 5,656,048 | A |   | 8/1997 | Smith et al. |
|---|---|---|---|---|
| 5,746,989 | A |   | 5/1998 | Murachi et al. |
| 6,109,024 | A | * | 8/2000 | Kinugasa et al. ............. 60/285 |
| 6,122,909 | A |   | 9/2000 | Murphy et al. |

(Continued)

FOREIGN PATENT DOCUMENTS

DE    198 27 195    12/1999

(Continued)

*Primary Examiner*—Thomas Denion
*Assistant Examiner*—Diem Tran
(74) *Attorney, Agent, or Firm*—Klaus J. Bach

(57) ABSTRACT

An internal combustion engine includes an exhaust-gas aftertreatment device, and an operating method is for operating the internal combustion engine. The internal combustion engine is operable with a lean mixture and a rich mixture, the internal combustion engine having an exhaust-gas aftertreatment device, which includes a nitrogen oxide storage catalytic converter and a particle filter. When lean exhaust gas flows through the nitrogen oxide storage catalytic converter, it removes nitrogen oxides from the exhaust gas by storing them, and, when reducing exhaust gas flows through the nitrogen oxide storage catalytic converter, it produces ammonia through reduction of stored and/or supplied nitrogen oxides and releases it to the exhaust gas. Downstream from the nitrogen oxide storage catalytic converter, the exhaust-gas aftertreatment device includes a SCR catalytic converter, which reduces nitrogen oxides contained in the exhaust gas, using ammonia produced by the nitrogen oxide storage catalytic converter.

12 Claims, 3 Drawing Sheets

U.S. PATENT DOCUMENTS

| | | |
|---|---|---|
| 6,176,079 B1 * | 1/2001 | Konrad et al. .............. 60/274 |
| 6,293,096 B1 | 9/2001 | Khair et al. |
| 6,415,602 B1 | 7/2002 | Patchett et al. |
| 6,588,205 B1 | 7/2003 | Kumagai et al. |
| 2002/0148218 A1 | 10/2002 | Hertzberg et al. |

FOREIGN PATENT DOCUMENTS

| | | |
|---|---|---|
| DE | 199 21 974 | 11/2000 |
| DE | 199 44 699 | 5/2001 |
| EP | 0 560 991 | 9/1993 |
| EP | 0 893 154 | 1/1999 |
| EP | 0 915 244 | 5/1999 |
| EP | 1 027 919 | 8/2000 |
| EP | 1 050 675 | 11/2000 |
| JP | 08294618 | 11/1996 |
| JP | 10 047041 | 2/1998 |
| WO | WO 01/12320 | 2/2001 |

\* cited by examiner

EXHAUST-GAS AFTERTREATMENT DEVICE WITH NITROGEN OXIDE STORAGE CATALYTIC CONVERTER, AND OPERATING METHOD THEREFOR

CROSS-REFERENCE TO RELATED APPLICATIONS

This application is a continuation of U.S. patent application Ser. No. 10/180,567, filed on Jun. 26, 2002, now U.S. Pat. No. 6,766,642, which is expressly incorporated herein in its entirety by reference thereto.

FIELD OF THE INVENTION

The present invention relates to an internal combustion engine having an exhaust-gas aftertreatment device.

BACKGROUND INVENTION

European Published Patent Application No. 0 560 991 describes an exhaust-gas aftertreatment device with nitrogen oxide storage catalytic converter, in which, during the lean-burn operating phases, the nitrogen oxides are removed from the exhaust gas from the associated internal combustion engine by being stored in the nitrogen oxide storage catalytic converter. In relatively short, rich-burn operating phases of the internal combustion engine, the nitrogen oxides, which are usually stored in nitrate form in the storage material of the nitrogen oxide storage catalytic converter, are released again and, at the catalytic centers of the catalytic converter, which are preferably formed by precious metals, such as for example platinum, are reacted with the reducing exhaust-gas constituents in the rich exhaust gas to form nitrogen (nitrate regeneration). The recurring alternation between lean-burn and rich-burn operating phases allows effective removal of nitrogen oxides from the exhaust gases from predominantly lean-burn internal combustion engines, such as lean-burn direct injection spark-ignition engines or diesel engines.

Nitrogen oxide storage catalytic converters are gradually deactivated by the uptake of sulphur which is present in the exhaust gas and accumulates in the storage material in the form of sulphates, thus increasingly reducing the ability of the nitrogen oxide storage catalytic converter to store nitrogen oxides over the course of time.

German Published Patent Application No. 198 27 195 describes a method which allows nitrogen oxide storage catalytic converters which have been deactivated in this manner to be regenerated. In methods of this or similar types, the sulphur which is stored in sulphate form is released from the nitrogen oxide storage catalytic converter under reducing conditions and at elevated temperatures, in the form of gaseous compounds (desulphating). It is preferable for the sulphur in sulphate form to be reduced to form sulphur dioxide ($SO_2$). Depending on the amount of sulphur which has built up in the nitrogen oxide storage catalytic converter and on the procedure used for desulphating, however, it is possible that some proportion of the sulphur which is in sulphate form may also be reduced to form gaseous hydrogen sulphide ($H_2S$). Since even the tiniest concentrations of hydrogen sulphide are experienced as an extremely unpleasant smell, the emission of $H_2S$ into the environment must be avoided at all costs during desulphating of the nitrogen oxide storage catalytic converters which have been deactivated by sulphur. However, conditions which are similar to those which are deliberately established during a desulphating operation may also occur during particular driving states, for example full-load enrichment, and may then likewise cause undesired emission of $H_2S$ into the environment.

German Published Patent Application No. 199 21 974 describes an exhaust-gas aftertreatment device which, in addition to a nitrogen oxide storage catalytic converter, has a particle filter, upstream of which there is an oxidation catalytic converter, the nitrogen oxide storage catalytic converter being arranged downstream of the particle filter in the exhaust-gas aftertreatment device. With the selected arrangement of oxidation catalytic converter, particle filter and nitrogen oxide storage catalytic converter, it is possible for both nitrogen oxides and particles to be effectively removed from the exhaust gas in particular from diesel engines. The oxidation catalytic converter has the function of oxidizing the nitrogen monoxide (NO) contained in the exhaust gas to form nitrogen dioxide ($NO_2$). The $NO_2$ which is formed oxidizes the particles, which predominantly include carbon and have been deposited on the particle filter, even at relatively low temperatures. However, in this case too it is necessary for the nitrogen oxide storage catalytic converter to be subjected to a desulphating procedure from time to time, and consequently, under corresponding operating states or driving states, the problem of $H_2S$ being released into the environment persists.

SUMMARY

It is an object of the present invention to provide an internal combustion engine having an exhaust-gas aftertreatment device, as well as an operating method therefor, which may render possible improved and more extensive exhaust-gas purification.

The above and other beneficial objects of the present invention are achieved by providing a device and a method as described herein.

The internal combustion engine according to an example embodiment of the present invention may provide that, downstream from a nitrogen oxide storage catalytic converter, an exhaust-gas aftertreatment device includes a SCR catalytic converter, which reduces nitrogen oxides contained in the exhaust gas, using ammonia produced by the nitrogen oxide storage catalytic converter. In this context, a SCR catalytic converter (SCR=selective catalytic reduction) should be understood to mean a catalytic converter which is generally employed to remove nitrogen oxides under oxidizing conditions. Catalytic converters of this type catalyze a selective reduction reaction in which nitrogen oxides are reduced using a reducing agent, e.g., ammonia ($NH_3$), to form harmless $N_2$.

Corresponding tests have shown that $H_2S$ which is fed to a SCR catalytic converter is reacted under reducing conditions to form $SO_2$, with the result that the release of $H_2S$ to the environment during the desulphating of nitrogen oxide storage catalytic converters, which is carried out under reducing conditions, may be avoided. Since $SO_2$ is far less odor-intensive than $H_2S$, this effectively solves the problem of $H_2S$ being released into the environment. Moreover, the desulphating methods, which are often complicated precisely in order to avoid the release of $H_2S$, may be greatly simplified. In this context, as is customary, the term reducing should be understood to mean a gas composition which, irrespective of any residual oxygen content, has an excess of constituents with a reducing action, such as hydrogen, carbon monoxide and/or hydrocarbons. The overall result, therefore, is an oxygen deficit with regard to the oxidation capacity of the abovementioned constituents with a reducing action.

The abovementioned benefits of preventing the release of $H_2S$ and/or $NH_3$ into the environment also arise if further components for cleaning exhaust gases, such as a particle filter or a 3-way catalytic converter or an oxidation catalytic converter, are provided in the exhaust-gas aftertreatment device, provided that the SCR catalytic converter is arranged downstream of the nitrogen oxide storage catalytic converter.

In one example embodiment according to the present invention, the SCR catalytic converter contains vanadium pentoxide ($V_2O_5$) and/or tungsten oxide ($WO_3$) and/or titanium dioxide ($TiO_2$).

In an example embodiment of a method according to the present invention, the internal combustion engine is in a desulphating operating mode, the method including the steps of:
  establishing a reducing exhaust-gas composition upstream of the nitrogen oxide storage catalytic converter,
  releasing the sulphur which is bound in the nitrogen oxide storage catalytic converter, to form hydrogen sulphide ($H_2S$),
  feeding the hydrogen sulphide to an SCR catalytic converter which is arranged downstream of the nitrogen oxide storage catalytic converter in the exhaust-gas aftertreatment device,
  and reacting the hydrogen sulphide in the SCR catalytic converter to form sulphur dioxide under reducing exhaust-gas conditions.

An example embodiment of a method of the present invention may provide that, after being treated by the nitrogen oxide storage catalytic converter, the exhaust gas is supplied to a SCR catalytic converter situated downstream in the exhaust-gas purification device, and, in a method step, ammonia is removed by the SCR catalytic converter from the ammonia-enriched exhaust gas by storing it, and, in a further method step, the nitrogen-oxide concentration of the exhaust gas is reduced by the SCR catalytic converter through catalyzed reduction of nitrogen oxides by ammonia, when a first operating mode of the internal combustion engine is set. In this context, the ammonia stored by the SCR catalytic converter may be produced in an upstream method step by reduction of nitrogen oxides that are stored in the nitrogen oxide storage catalytic converter and/or supplied.

The desulphating operating mode of the internal combustion engine may, for example, include a purely rich-burn operating mode of the internal combustion engine with an air/fuel ratio ($\lambda$) of 0.98 or less which is established for several seconds at simultaneously increased exhaust-gas temperatures of approximately 500° C. or more. However, it is also possible to establish an oscillating lean/rich cyclical operation or to establish individual, short rich-burn operating phases, which are separated a number of times by lean-burn operating phases, for desulphating purposes. According to the method of the present invention, the desulphating may be carried out such that predominantly $H_2S$ is formed and is then converted into $SO_2$ in the downstream SCR catalytic converter under reducing conditions, so that the odor problem during desulphating may be avoided. It is possible to eliminate the use of desulphating methods, which are particularly complicated in view of the need to avoid the release of $H_2S$, for example only very slight enrichment of approximately $\lambda=0.99$, optionally interrupted a number of times by lean-burn operating phases.

The likelihood of $H_2S$ being released during the desulphating of nitrogen oxide storage catalytic converters with a relatively high sulphur load is correspondingly more pronounced. To avoid the release of $H_2S$ as a result of considerable accumulation of sulphur, the desulphating may be carried out at relatively regular intervals, although this may be disadvantageous in terms of fuel consumption and driveability. However, the use of the method according to the present invention allows a relatively high accumulation of sulphur in the nitrogen oxide storage catalytic converter to be tolerated, and consequently the time intervals between desulphating operations may be selected to be correspondingly long, which may lead to considerable advantages with regard to operation of the internal combustion engine.

DETAILED DESCRIPTION

Figure 1:
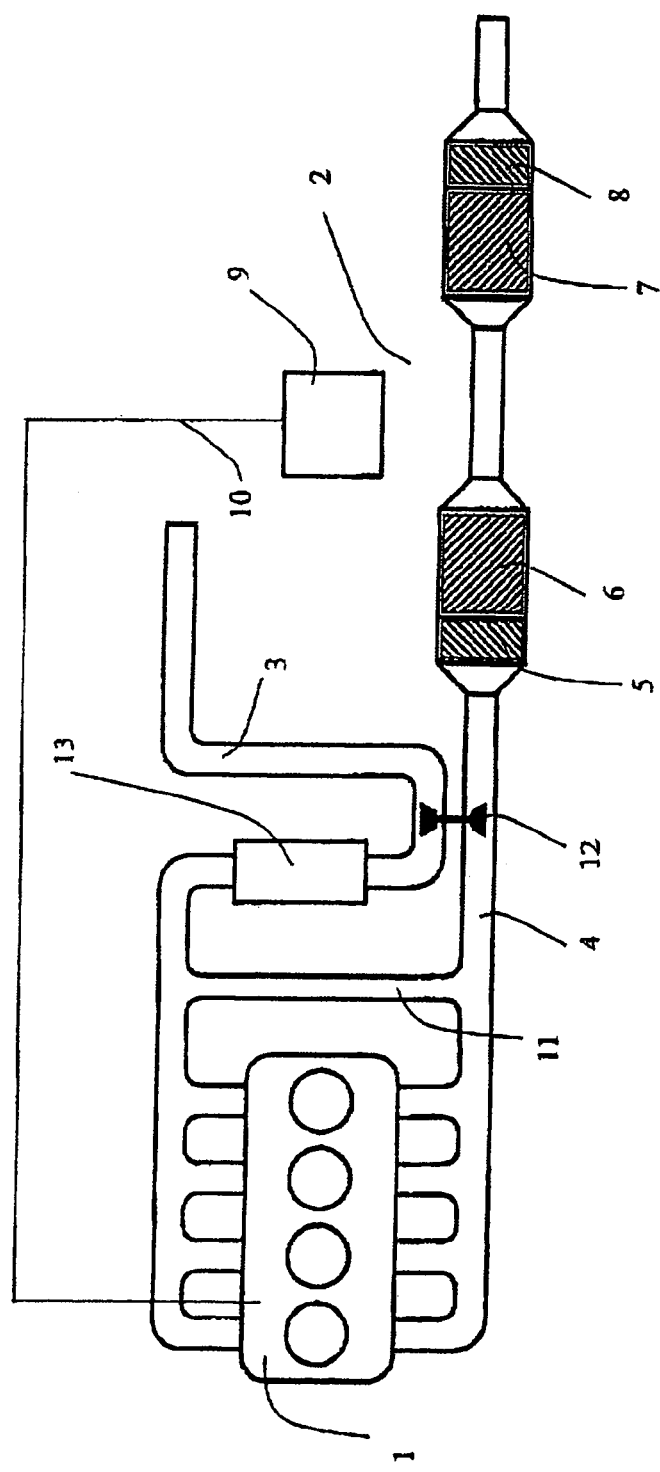
FIG. 1 is a schematic circuit diagram of an internal combustion engine with associated exhaust-gas cleaning installation.

In the example embodiment illustrated in FIG. 1, a diesel engine is used as the internal combustion engine 1. Combustion air is fed to the internal combustion engine via the intake air line 3. The internal combustion engine 1 is assigned the exhaust-gas aftertreatment device 2, which in the exhaust pipe 4 has an oxidation catalytic converter 5, a particle filter 6, a nitrogen oxide storage catalytic converter 7 and a SCR catalytic converter 8.

In this example embodiment, the particle filter 6 is connected immediately downstream of the oxidation catalytic converter 5, and the SCR catalytic converter 8 is connected immediately downstream of the nitrogen oxide storage catalytic converter 7. An exhaust-gas turbo charger 12, which is used to compress the combustion air, which is cooled by a charge-air cooler 13 arranged in the intake air line after it has been compressed, is accommodated in the exhaust pipe 4, upstream of the oxidation catalytic converter 5. Furthermore, the internal combustion engine 1 is assigned a control unit 9 which is used, inter alia, to control combustion. A control or signal line 10 is provided for transmission of the control signals required for this purpose. Further components which are used to measure and control operating parameters, such as oxygen sensors, temperature sensors, throttle valves, further signal lines, etc., may be present as required as peripherals for the internal combustion engine 1 or for the exhaust-gas aftertreatment device 2.

The internal combustion engine 1 is operated primarily in lean-burn mode. Particles which are present in the exhaust gas are retained in the particle filter 6. When the exhaust gas passes through the oxidation catalytic converter 5, NO which is present in the exhaust gas is oxidized to form $NO_2$ and then, in the downstream particle filter 6, may in turn oxidize carbon-containing particles which have accumulated at this filter, with the result that the particle filter 6 is continuously regenerated. The exhaust gas which flows out of the particle filter and still contains nitrogen oxides is fed to the nitrogen oxide storage catalytic converter 7 which removes the nitrogen oxides from the exhaust gas by storing them, e.g., in nitrate form. Nitrate regeneration of the storage catalytic converter 7 is performed from time to time as a function of the quantity of stored nitrogen oxides. For this purpose, the internal combustion engine 1 is briefly switched to rich-burn mode, with the result that a rich exhaust gas is generated, with an excess of reducing agents, such as carbon monoxide, hydrogen or hydrocarbons. This leads to the nitrogen oxides which are stored in the nitrogen oxide storage catalytic converter 7 being released, and these nitrogen oxides are then reduced by the reducing agents in the exhaust gas at the precious-metal centers which are present in the catalytic layer of the nitrogen oxide storage catalytic converter.

The main product formed as a result of the reduction of the nitrogen oxide is nitrogen. In addition, depending on the conditions under which the nitrate regeneration is carried out, greater or lesser quantities of the reduction product $NH_3$ are also formed. It may be undesirable for this compound to be released into the environment. Since, typically, in particular $V_2O_5$-containing SCR catalytic converters have a pronounced capacity to store $NH_3$, however, $NH_3$ may be collected by being taken up with the aid of the SCR catalytic converter 8 which according to the present invention is arranged downstream of the nitrogen oxide storage catalytic converter 7. In the lean-burn internal combustion engine operation which follows the nitrate regeneration, this accumulated $NH_3$ is available as an additional reducing agent for the selective reduction of nitrogen oxides in the SCR catalytic converter 8. This additionally may increase the efficiency of the removal of nitrogen oxides in the exhaust-gas aftertreatment device 2.

When sulphur-containing fuel is used, the exhaust gas from the internal combustion engine 1 contains sulphur dioxide, which is taken up by the catalytic material of the nitrogen oxide storage catalytic converter 7 to form stable sulphates, which may increasingly reduce the ability of the catalytic converter to store nitrogen oxides over the course of time. Therefore, accumulated sulphur may have to be constantly removed from the nitrogen oxide storage catalytic converter 7 in a regeneration operation using a desulphating procedure. For this purpose, the internal combustion engine 1 is switched to a desulphating operating mode. This desulphating operating mode involves increasing the exhaust-gas temperature to over 500° C., for example by further injection of fuel, and establishing a reducing exhaust-gas composition, to air/fuel ratio ($\lambda$) values of approximately 0.95 or below, in a similar manner to that used for nitrate regeneration. Under these conditions, it is possible for the relatively stable sulphates in the nitrogen oxide storage catalytic converter 7 to be decomposed by reduction. Depending on the temperature, the degree of enrichment and the quantity of sulphur stored in the nitrogen oxide storage catalytic converter, greater or lesser quantities of $H_2S$ are formed. However, this $H_2S$ is reacted under the reducing conditions of the desulphating to form much less odor-intensive $SO_2$ at the SCR catalytic converter 8, which according to the present invention is arranged downstream of the nitrogen oxide storage catalytic converter 7. As a result, the odor problem which is usually associated with the desulphating of nitrogen oxide storage catalytic converters may be avoided.

A particular benefit of using the SCR catalytic converter 8 downstream of the nitrogen oxide storage catalytic converter 7 for the purpose of converting $H_2S$ into $SO_2$ under reducing conditions may be that in this manner the desulphating procedure may be simplified, since it does not have to seek to minimize the levels of the undesirable desulphating product $H_2S$. For example, the desulphating may be shortened significantly by greater enrichment of the mix, with $\lambda$ values of below 0.95, with an associated increased and quicker release of $H_2S$ from the nitrogen oxide storage catalytic converter 7.

The possibility of using the SCR catalytic converter 8 downstream of the nitrogen oxide storage catalytic converter 7 in order to convert $H_2S$ into $SO_2$ under reducing conditions is not dependent on the presence of the upstream cleaning components, such as for example particle filter 6 and oxidation catalytic converter 5. Rather, the action which has been described occurs independently of these aspects, and consequently it is also possible for other or further exhaust-gas cleaning components, depending on the particular requirement, to be connected upstream or downstream of the SCR catalytic converter 8.

Figure 2:
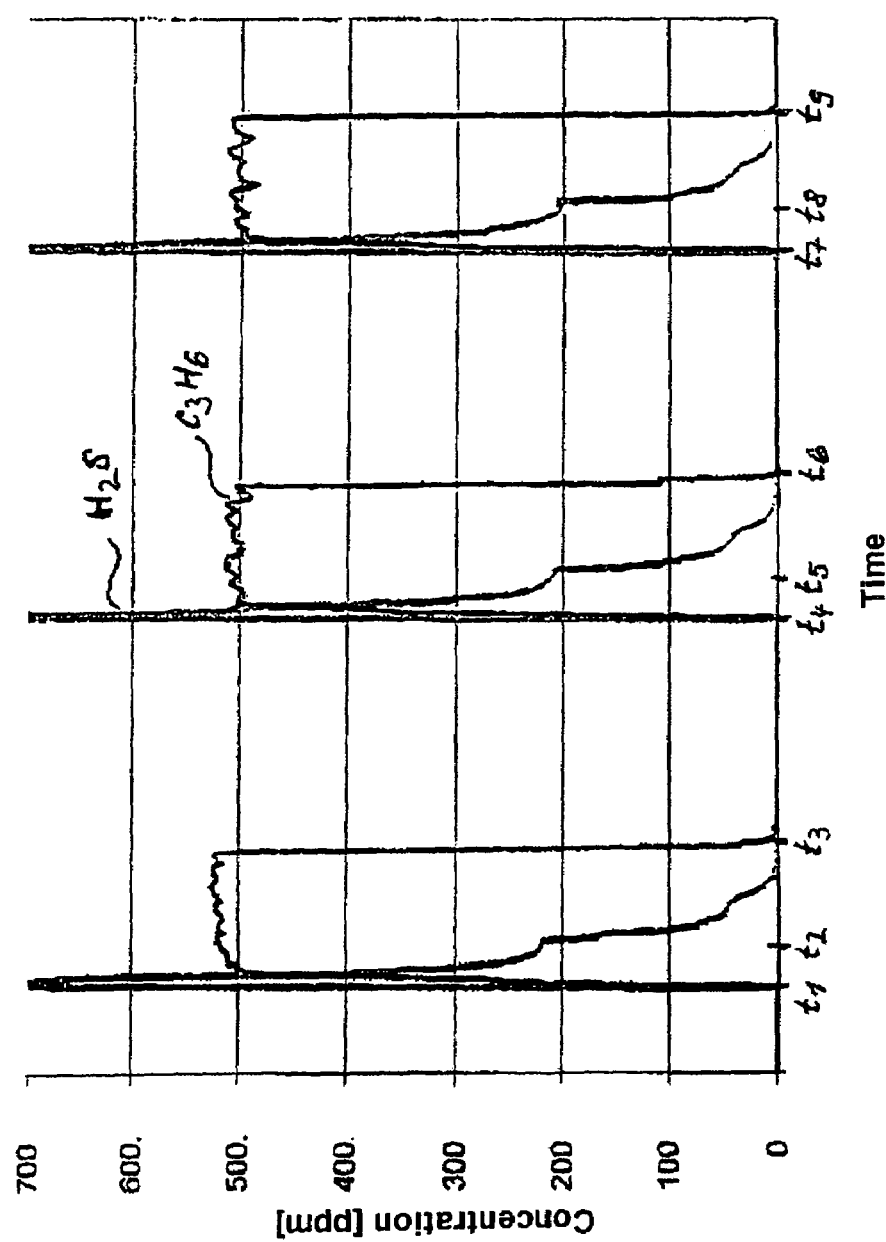
FIG. 2 illustrates a measurement result, which is illustrated in diagram form, of a laboratory test with a periodic gas change and cyclical supply of $H_2S$ without a SCR catalytic converter in the gas path.
Figure 3:
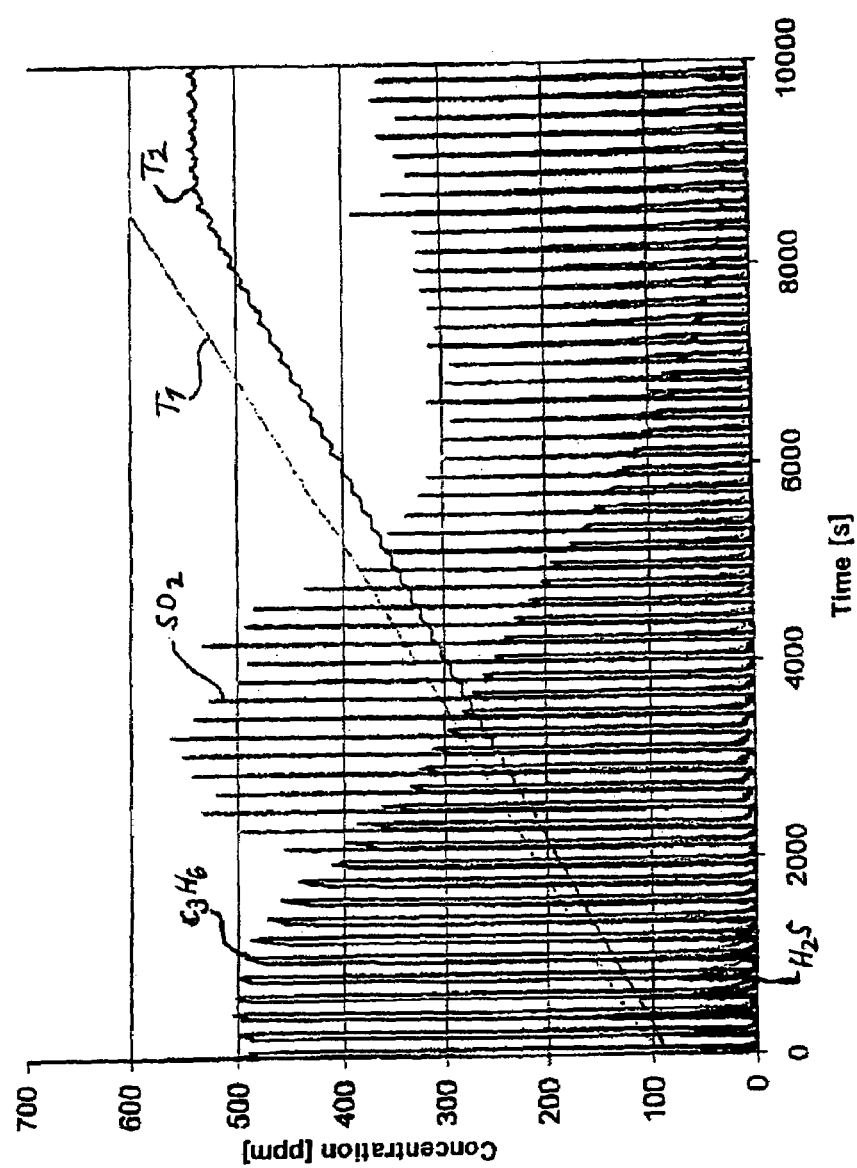
FIG. 3 illustrates a diagram which is similar to that illustrated in FIG. 2, with a result of a test which is similar to that carried out in FIG. 2, but with a SCR catalytic converter in the gas path.

The diagrams illustrated in FIG. 2 and FIG. 3 explain the effect of the SCR catalytic converter with regard to the conversion of $H_2S$ into $SO_2$ under reducing conditions. The diagrams illustrate results of laboratory tests in which synthetic test gases A, B and C with the following compositions have been used:

| | |
|---|---|
| Test gas A: | 8% $CO_2$ |
| | 10% $O_2$ |
| | 8% $H_2O$ |
| Test gas B: | 2500 ppm $H_2$ |
| | 7500 ppm CO |
| | 500 ppm $C_3H_6$ |
| | 2000 ppm $O_2$ |
| | 8% $CO_2$ |
| | 8% $H_2O$ |
| Test gas C: | same as test gas B, but with the addition of 500 ppm of $H_2S$. |

Test gas A reproduces an exhaust gas from an internal combustion engine which is operated in a very lean-burn mode. The composition of test gas B approximately corresponds to the composition of the exhaust gas from an internal combustion engine which is operated in rich-burn mode, similar to that which is to be expected when a desulphating operating mode is established. Test gas C, compared to test gas B, has the same composition but with the addition of $H_2S$ in a concentration which may occur during a correspondingly executed desulphating operation.

In a blind test, the laboratory testing installation was initially exposed to the test gases in succession, cyclically, without a catalytic converter, and the concentrations of the gases on the outlet side of the installation were recorded by a metrological arrangement. In accordance with the times t1 to t9 which are plotted on the horizontal time axis of the diagram shown in FIG. 2, the laboratory testing installation was exposed to the $H_2S$-containing test gas C at times t1, t4 and t7. At times t2, t5 and t8, the gas was changed to test gas B, and at times t3, t6 and t9 to test gas A. The time for which test gas C was supplied (t2–t1, t5–t4, t8–t7) was in each case 20 s. Accordingly, the time for which test gas B was supplied was in each case 40 s, and the time for which test gas A was supplied was in each case 120 s. As illustrated in FIG. 2, during phases in which the $H_2S$-containing test gas C is supplied, in each case a correspondingly high $H_2S$ concentration is measured, with a certain overshoot above the set value being observed immediately after test gas C starts to be supplied, which originates from the metrology. After switching to the H$_2$S-free rich test gas B, the H$_2$S concentration rapidly drops to zero. The switch to the supply of the lean test gas A may be recognized from in that the C$_3$H$_6$ concentration drops to zero. When the test gas C, which likewise contains C$_3$H$_6$, is next switched on, an immediate rise in the C$_3$H$_6$ concentration to the set value of 500 ppm is recorded.

In this blind test, it is of particular importance that there is no formation of SO$_2$, as determined by metrology. This is apparent in the diagram on account of the absence of a corresponding SO$_2$ concentration trace.

FIG. 3 illustrates a result of a laboratory test which was carried out in a similar manner. However, in this test the test gases A, B and C were passed over a conventional SCR catalytic converter with a V$_2$O$_5$ content of 3%. The space velocity set for the gas throughput was 35,000 l/h. During the periodic gas change as described above, at the same time the temperature of the test installation or of the catalytic converter was increased continuously. This is illustrated in the measurement diagram shown in FIG. 3 by measurement curves T1 and T2, which correspond to the temperatures measured upstream of the catalytic converter and downstream of the catalytic converter. Since the time scale of the diagram shown in FIG. 3 has changed from that of the diagram shown in FIG. 2, the changes in the concentration of the gas components which occur during the cyclical gas change are in this case illustrated as narrow peaks. However, it remains apparent that small quantities of H$_2$S may only be measured on the output side of the test installation while the test is starting up, at temperatures below 150° C. Above approximately 150° C., it is no longer possible to detect any H$_2$S, and H$_2$S is increasingly reacted to form SO$_2$ during the test phases in which rich test gas is supplied. The ever-greater drop in the concentration of C$_3$H$_6$ as the temperature rises in the test phases in which rich test gas is supplied is of no importance with regard to the reaction of H$_2$S to form SO$_2$ and is attributable to oxidation or C$_3$H$_6$ reaction on the basis of a steam reforming process.

Overall, the laboratory test demonstrates that even relatively high concentrations of H$_2$S in a desulphating process under reducing conditions are reacted to form SO$_2$ at a conventional SCR catalytic converter at temperatures of over approximately 150° C.

What is claimed is:

1. An internal combustion engine comprising an arrangement for operating the internal combustion engine in a first operating mode, in a which a lean exhaust gas is generated by the internal combustion engine, a second operating mode, in which a reducing exhaust gas is generated by the internal combustion engine, and a third, desulfating operating mode, and an exhaust gas treatment system through which the exhaust gas of the internal combustion engine is conducted, the exhaust gas treatment system including a nitrogen oxide storage catalytic converter for removing, in the first operating mode, nitrogen oxides and sulfur oxides from the exhaust gas and storing it in the nitrogen oxide storage catalytic converter and, in the second operating mode with a reducing hot exhaust gas, releasing nitrogen oxide stored in the nitrogen oxide catalytic converter and reducing it and thereby also producing ammonia by the reduction of nitrogen oxides in, or released to, the exhaust gas from the nitrogen oxide storage catalytic converter and, in the third, desulfating operating mode, releasing sulfur oxides deposited in the nitrogen oxide storage catalytic converter as sulfur-containing compounds, and an SCR catalytic converter arranged downstream of the nitrogen oxide storage catalytic converter to receive the ammonia produced by the nitrogen storage catalytic converter in the second operating mode and also the sulfur-containing compounds released in the third, desulfating operating mode and being configured to convert the sulfur-containing compounds to SO$_2$ and to absorb the ammonia from the exhaust gas in the second operating mode, and the reduce nitrogen oxides in the exhaust gas with the ammonia stored in the SCR catalytic converter.

2. The internal combustion engine according to claim 1, wherein the SCR catalytic converter includes at least one of vanadium pentoxide, tungsten oxide and titanium dioxide.

3. The internal combustion engine according to claim 1, wherein a particle filter is arranged upstream of the nitrogen oxide storage catalytic converter.

4. The internal combustion engine according to claim 1, wherein a particle filter is arranged upstream of the SCR catalytic converter.

5. The internal combustion engine according to claim 4, wherein the exhaust gas treatment system includes an oxidation catalytic converter arranged upstream of the particle filter.

6. A method for operating a diesel engine, comprising:
supplying exhaust gas of the diesel engine to an exhaust gas treatment device including a nitrogen oxide storage catalytic converter, a particle filter, and a SCR catalytic converter which is arranged downstream of the nitrogen oxide storage catalytic converter,
retaining on the particle filter particles which are present in the exhaust gas to obtain a filtered exhaust gas,
operating the diesel engine in a first operating mode so as to produce a lean exhaust gas wherein nitrogen oxides are removed from the exhaust gas and stored in the nitrogen oxide storage catalytic converter,
operating the diesel engine in a second operating mode so as to produce a reducing exhaust gas whereby ammonia is produced from the nitrogen oxide contained in the exhaust gas and stored in the nitrogen oxide storage catalytic converter by reduction of nitrogen oxides, and the ammonia is released into the exhaust gas flow,
conducting the filtered exhaust gas including the ammonia through the SCR catalytic converter wherein the ammonia is deposited, whereby, in the first operating mode, nitrogen oxide of the exhaust gas passing through the SCR catalytic converter is catalytically reduced with the ammonia stored in the SCR catalytic converter to nitrogen and water, and
operating the diesel engine in a desulphating operating mode to release sulfur-containing compounds from the nitrogen oxide storage catalytic converter into the exhaust gas and
conducting the exhaust gas including the sulfur-containing compounds to the SCR catalytic converter.

7. The method according to claim 6, wherein, in the desulphating operating mode, the sulfur of the sulfur-containing compounds is converted in the SCR catalytic converter to sulfur dioxide.

8. The method according to claim 6, wherein the exhaust gas is conducted through an oxidation catalytic converter before it is conducted throught the particle filter.

9. A diesel engine having an exhaust system comprising:
means for operating the diesel engine in a first operating mode, in which a lean exhaust gas is formed, a second operating mode, in which a reducing exhaust gas is formed, and in a third, desulphating operating mode,
said exhaust system including an exhaust gas treatment means through which exhaust gas from the diesel engine is conducted and which comprises a nitrogen oxide storage catalytic converter for removing nitrogen oxides from the exhaust gas by storage in the nitrogen oxide storage catalytic converter in the first engine operating mode and also producing ammonia by reduction of at least one of the stored and the supplied nitrogen oxide in the second operating mode, a SCR catalytic converter arranged downstream of the nitrogen oxide storage catalytic converter for storing the ammonia generated by the reduction of nitrogen oxides in the second operating mode and reducing additional nitrogen oxides in the exhaust gas in the SCR catalytic converter by reaction with the ammonia stored therein, and, in the third, desulphating mode of operation, sulfur-containing compounds released from the nitrogen oxide storage catalytic converter are supplied to the SCR catalytic converter, and a particle filter arranged upstream of the SCR catalytic converter for filtering particles out of the exhaust gas so as to supply particle-free exhaust gas to the SCR catalytic converter.

10. A diesel engine according to claim 9, wherein the particle filter is arranged upstream of the nitrogen oxide storage catalytic converter.

11. A diesel engine according to claim 9, wherein the exhaust gas treatment system includes an oxidation catalytic converter.

12. A diesel engine according to claim 11, wherein the oxidation catalytic converter is arranged upstream of the particle filter.

* * * * *